(12) United States Patent
Missotten et al.

(10) Patent No.: US 12,457,930 B2
(45) Date of Patent: Nov. 4, 2025

(54) COMBINE HARVESTER WITH TILTED CROP MATERIAL SENSOR ARRANGEMENT

(71) Applicant: CNH Industrial America LLC, New Holland, PA (US)

(72) Inventors: Bart M.A. Missotten, Herent (BE); Arno Leenknegt, Hooglede (BE); Dré W.J. Jongmans, Klundert (NL); Thomas Mahieu, Vleteren (BE); Bart Lenaerts, Zutendaal (BE); Yuanyuan Li, Leuven (BE); Lucas Deruyter, Gits (BE); Frederik Tallir, Esen (BE)

(73) Assignee: CNH Industrial America LLC, New Holland, PA (US)

( * ) Notice: Subject to any disclaimer, the term of this patent is extended or adjusted under 35 U.S.C. 154(b) by 782 days.

(21) Appl. No.: 17/835,149

(22) Filed: Jun. 8, 2022

(65) Prior Publication Data

US 2022/0394925 A1    Dec. 15, 2022

(30) Foreign Application Priority Data

Jun. 9, 2021    (EP) .................................... 21178625

(51) Int. Cl.
*A01D 41/127*    (2006.01)
*A01D 41/12*    (2006.01)
(Continued)

(52) U.S. Cl.
CPC ..... *A01D 41/1271* (2013.01); *A01D 41/1243* (2013.01); *G06T 7/0002* (2013.01);
(Continued)

(58) Field of Classification Search
CPC ...... G05D 1/648; G05D 1/689; G06T 7/0002; G06T 2207/20081; G06T 2207/30128;
(Continued)

(56) References Cited

U.S. PATENT DOCUMENTS 6,199,000 B1    3/2001    Keller et al.
6,591,145 B1    7/2003    Hoskinson et al.
(Continued)

FOREIGN PATENT DOCUMENTS

EP    1514466 A2        3/2005
EP    1862055 A2 *    12/2007    ......... A01D 41/1243
(Continued)

OTHER PUBLICATIONS

Extended European Search Report for European Application No. 211 786 25.6, dated Nov. 29, 2021, 7 pages.

*Primary Examiner* — Arpad Fabian-Kovacs
(74) *Attorney, Agent, or Firm* — Buchanan Ingersoll & Rooney PC (57) ABSTRACT

A combine harvester includes a crop material sensor arrangement having a crop material sensor configured to monitor crop material downstream of a threshing and separating system of the combine, and having a sensor window through which the crop material sensor monitors the crop material. The sensor window is arranged adjacent to a flow path of the crop material such that crop material flows past the sensor window as it flows along the flow path, and the sensor window is arranged such that an angle is formed between a plane defined by the sensor window and a tangential projection that extends from a component of the combine harvester that influences the flow path immediately upstream of the sensor window. This ensures that the camera window remains sufficiently clean to allow the crop material sensor to monitor crop material through the window.

20 Claims, 7 Drawing Sheets

(51) Int. Cl.
*G06T 7/00* (2017.01)
*A01B 79/00* (2006.01)
*G05D 1/648* (2024.01)
*G05D 1/689* (2024.01)
*G06V 20/56* (2022.01)

(52) U.S. Cl.
CPC ............ *A01B 79/005* (2013.01); *G05D 1/648* (2024.01); *G05D 1/689* (2024.01); *G06T 2207/20081* (2013.01); *G06T 2207/30128* (2013.01); *G06T 2207/30188* (2013.01); *G06T 2207/30242* (2013.01); *G06V 20/56* (2022.01)

(58) Field of Classification Search
CPC ........... G06T 2207/30188; G06T 2207/30242; G06V 20/56; A01D 41/1243; A01D 41/1271; A01F 12/40
See application file for complete search history.

(56) References Cited

U.S. PATENT DOCUMENTS

| | | | |
|---|---|---|---|
| 7,367,880 B2 * | 5/2008 | Hoskinson | A01D 41/1277 460/4 |
| 7,467,997 B2 | 12/2008 | Niermann et al. | |
| 9,600,872 B2 | 3/2017 | Dima | |
| 10,470,365 B2 | 11/2019 | Mahieu et al. | |
| 2003/0162576 A1 * | 8/2003 | Bueermann | A01F 12/40 460/112 |
| 2006/0009269 A1 | 1/2006 | Hoskinson et al. | |
| 2015/0038201 A1 * | 2/2015 | Brinkmann | A01F 12/40 460/112 |
| 2015/0348419 A1 | 12/2015 | Matthews | |
| 2016/0088794 A1 * | 3/2016 | Baumgarten | A01D 41/127 460/1 |
| 2017/0055445 A1 * | 3/2017 | Mahieu | A01F 12/40 |
| 2017/0118914 A1 | 5/2017 | Bruns et al. | |
| 2018/0098495 A1 * | 4/2018 | Van Meurs | A01D 75/00 |
| 2018/0303030 A1 * | 10/2018 | Heitmann | A01D 43/085 |
| 2019/0053427 A1 * | 2/2019 | Matway | A01D 41/1271 |
| 2019/0090428 A1 * | 3/2019 | Rittershofer | A01D 75/282 |
| 2019/0104681 A1 * | 4/2019 | Larson | A01F 12/40 |
| 2020/0022309 A1 * | 1/2020 | Fries | A01D 61/008 |
| 2020/0060082 A1 * | 2/2020 | Shinners | A01F 29/04 |
| 2020/0077591 A1 * | 3/2020 | Xu | A01D 41/1243 |
| 2020/0163279 A1 * | 5/2020 | Fries | A01D 61/002 |
| 2021/0015039 A1 | 1/2021 | Vandike et al. | |
| 2021/0127573 A1 * | 5/2021 | Mahieu | A01D 41/1243 |
| 2024/0315169 A1 * | 9/2024 | Vandike | A01D 41/1243 |
| 2024/0423129 A1 * | 12/2024 | Cazenave | A01D 41/1243 |
| 2025/0072325 A1 * | 3/2025 | Singh | A01D 41/1271 |

FOREIGN PATENT DOCUMENTS

| | | | | |
|---|---|---|---|---|
| EP | 2918159 | A1 | 9/2015 | |
| EP | 2936962 | A1 * | 10/2015 | ......... A01D 41/1243 |
| EP | 3138383 | A1 | 3/2017 | |
| EP | 3298880 | A1 * | 3/2018 | ......... A01D 41/1243 |
| EP | 3406124 | A1 | 11/2018 | |
| EP | 4144201 | A1 * | 3/2023 | ......... A01D 41/1243 |
| WO | 2018162699 | A1 | 9/2018 | |
| WO | 2018235486 | A1 | 12/2018 | |

* cited by examiner

COMBINE HARVESTER WITH TILTED CROP MATERIAL SENSOR ARRANGEMENT

CROSS-REFERENCE TO RELATED APPLICATION

This application claims priority to European Patent Application No. 21178625.6, filed Jun. 9, 2021, the content of such application being incorporated by reference herein in its entirety.

TECHNICAL FIELD

The present invention relates to a combine harvester and, in particular, to a combine harvester including a crop material sensor arrangement that is for monitoring crop material being processed by the combine harvester and that is tilted relative to a flow path of the crop material.

BACKGROUND

An agricultural harvester such as a combine harvester or 'combine' performs multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank on-board the combine. A cleaning fan blows air through the sieves to discharge chaff and other debris toward the rear of the combine. Non-grain crop material such as straw from the threshing section proceeds through a residue system, which may utilise a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

More particularly, a threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine through a chopper assembly or arrangement and discharged back to the field using a spreader system. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

After passing through the threshing and separating system, the coarse non-grain crop material can flow into the chopper arrangement to be cut into finer pieces before being thrown to a spreader to be spread on the field. Chopping the non-grain crop material into finer pieces increases the surface area of the crop material, allowing for quicker decomposition. One type of chopper arrangement that is commonly used has multiple moving knives that cooperate with stationary counter knives to chop the crop material into finer pieces. A shear bar can also be placed after the stationary counter knives to impede the flow of the crop material through the chopper arrangement and increase the chop quality or intensity.

In certain cases, the user may not want the crop material that passes through the chopper arrangement to be cut into finer pieces. In such instances, the user can switch the chopper arrangement from a chopping mode where the counter knives are raised to cooperate with the moving knives to chop the crop material and a disengaged mode where the counter knives are lowered so that the counter knives do not cooperate with the moving knives. When the counter knives are lowered, the moving knives simply push any contacted crop material toward the rear of the combine with minimal or zero chopping.

An agricultural harvester may include one or more sensors, e.g. cameras, to monitor various aspects of crop material as it is processed by the harvester. For instance, a camera may be used to monitor a quality of chopping performed by the chopper arrangement to ensure the chopping is at a desired level. One issue is that, during use, various substances, e.g. crop material, dust, dirt, etc., may become stuck to, or otherwise block, the sensor surfaces such that the sensor can no longer accurately monitor aspects of the crop material.

It is against this background to which the present invention is set.

SUMMARY OF THE INVENTION

According to an aspect of the invention there is provided a combine harvester comprising a threshing and separating system. The harvester comprises a crop material sensor arrangement comprising a crop material sensor configured to monitor crop material, in particular crop residue, downstream of the threshing and separating system, and a sensor window through which the crop material sensor monitors the crop material. The sensor window is arranged adjacent to a flow path of the crop material such that crop material flows past the sensor window as it flows along the flow path. The sensor window is arranged such that an angle is formed between a plane defined by the sensor window and a tangential projection that extends from a component of the combine harvester that influences the flow path immediately upstream of the sensor window.

The sensor window may be spaced apart from the component that influences the flow path immediately upstream of the sensor window. The angle may be greater than a prescribed first minimum threshold. Optionally, the prescribed first minimum threshold is approximately 29 degrees. Optionally, the angle is less than a prescribed first maximum threshold. Optionally, the prescribed first maximum threshold is approximately 44 degrees.

The sensor window may be flush with the component that influences the flow path immediately upstream of the sensor window. The angle may be less than a prescribed second maximum threshold. Optionally, the prescribed second maximum threshold is approximately 15 degrees. Optionally, the angle is greater than a prescribed second minimum threshold. Optionally, the prescribed second minimum threshold is approximately 5 degrees.

The combine harvester may comprise a chopper arrangement configured to perform chopping on crop material downstream of the threshing and separating system. The crop material sensor arrangement may be arranged to monitor crop material downstream of the chopper arrangement.

The crop material sensor may be a chop quality sensor configured to monitor a quality of chopping performed by the chopper arrangement. Optionally, the chop quality sensor is a camera configured to collect images of crop material as it flows along the flow path.

The combine harvester may comprise a spreader arrangement downstream of the chopper arrangement. The crop material sensor arrangement may be arranged to monitor crop material prior to it exiting the spreader arrangement.

The crop material sensor arrangement my be arranged to monitor crop material between the chopper arrangement and the spreader arrangement as it flows along the flow path.

The chopper arrangement may comprise a chopper housing defining a crop material exit through which crop material exits the chopper arrangement as it flows along the flow path. The crop material sensor arrangement may be arranged adjacent to the crop material exit of the chopper arrangement. The component that influences the flow path immediately upstream of the sensor window may be an end portion of the chopper housing that defines the crop material exit.

The crop material sensor arrangement may be arranged to monitor crop material in the spreader arrangement. The component that influences the flow path immediately upstream of the sensor window may be a part of the spreader arrangement adjacent to an upstream edge of the sensor window.

The combine harvester may comprise a deflector configured to deflect the flow path of crop material towards the crop material sensor arrangement. The component that influences the flow path immediately upstream of the sensor window may be the deflector. Optionally, the deflector is mounted to the chopper housing.

A position of the deflector may be adjustable relative to the sensor window.

A position of the sensor window may be adjustable relative to the component that influences the flow path immediately upstream of the sensor window. Optionally, the position of the sensor window is adjustable by at least one of: adjusting a tilt angle of the sensor window relative to the component immediately upstream; and, adjusting a level of insertion of the sensor window into the flow path.

The combine harvester may comprise a controller configured to send an actuator control signal to an actuator of the combine harvester to control the actuator to adjust the angle between the plane defined by the sensor window and the tangential projection that extends from the component of the combine harvester that influences the flow path immediately upstream of the sensor window. Optionally, the actuator control signal controls the actuator to adjust the position of the sensor window or the deflector. Optionally, the actuator control signal controls the actuator to adjust the sensor window position or deflector in dependence on at least one of: a type of crop being processed by the combine harvester; and, one or more harvesting conditions in which the combine harvester is operating.

The controller may be configured to control the actuator to adjust the angle in dependence on a chopper speed or beater speed of the combine harvester.

The controller may be configured to: receive sensor data from the crop material sensor indicative of a current level of transparency of the sensor window; determine, based on the received sensor data, whether to initiate a cleaning cycle to increase the level of transparency of the sensor window; and, send the actuator control signal to control the actuator to temporarily increase the angle to increase cleaning of the sensor window for the duration of the cleaning cycle.

According to another aspect of the present invention there is provided a controller for controlling operation of an agricultural harvester or combine harvester. The combine harvester includes a threshing and separating system, and the combine harvester includes a crop material sensor arrangement comprising a crop material sensor configured to monitor crop material downstream of the threshing and separating system, and a sensor window through which the crop material sensor monitors the crop material. The crop material sensor arrangement is arranged adjacent to a flow path of the crop material such that crop material contacts the sensor window as it flows along the flow path. The controller is configured to send an actuator control signal to an actuator of the combine harvester to control the actuator to adjust an angle that is formed between a plane defined by the sensor window and a tangential projection that extends from a component of the combine harvester that influences the flow path immediately upstream of the sensor window.

The actuator control signal may control the actuator to adjust a level of insertion of the sensor window into the flow path.

Optionally, the actuator control signal may control the actuator to adjust the sensor window position in dependence on at least one of: a type of crop being processed by the combine harvester; and, one or more harvesting conditions in which the combine harvester is operating.

The controller may be configured to control the actuator to adjust the position of the sensor window in dependence on a chopper speed or beater speed of the combine harvester.

The controller may be configured to: receive sensor data from the crop material sensor indicative of a current level of transparency of the sensor window; determine, based on the received sensor data, whether to initiate a cleaning cycle to increase the level of transparency of the sensor window; and, send the actuator control signal to control the actuator to temporarily adjust the sensor window position, or a position of a deflector component of the harvester, to a position that increases cleaning of the sensor window for the duration of the cleaning cycle.

According to another aspect of the present invention there is provided a method of controlling operation of an agricultural harvester or combine harvester. The combine harvester includes a threshing and separating system, and the combine harvester includes a crop material sensor arrangement comprising a crop material sensor configured to monitor crop material downstream of the threshing and separating system, and a sensor window through which the crop material sensor monitors the crop material. The crop material sensor arrangement is arranged adjacent to a flow path of the crop material such that crop material contacts the sensor window as it flows along the flow path. The method comprises sending an actuator control signal to an actuator of the combine harvester to control the actuator to adjust an angle that is formed between a plane defined by the sensor window and a tangential projection that extends from a component of the combine harvester that influences the flow path immediately upstream of the sensor window.

The method may comprise controlling the actuator to adjust a level of insertion of the sensor window into the flow path.

The method may comprise controlling the actuator to adjust the sensor window position in dependence on at least one of: a type of crop being processed by the combine harvester; and, one or more harvesting conditions in which the combine harvester is operating.

The method may comprise controlling the actuator to adjust the position of the sensor window in dependence on a chopper speed or beater speed of the combine harvester.

The method may comprise: receiving sensor data from the crop material sensor indicative of a current level of transparency of the sensor window; determining, based on the received sensor data, whether to initiate a cleaning cycle to increase the level of transparency of the sensor window; and, sending the actuator control signal to control the actuator to temporarily adjust the sensor window position, or a position of a deflector component of the combine, to a position that increases cleaning of the sensor window for the duration of the cleaning cycle.

According to another aspect of the present invention there is provided a non-transitory, computer-readable storage medium storing instructions thereon that when executed by a processor causes the processor to perform the method described above.

BRIEF DESCRIPTION OF THE DRAWINGS

One or more embodiments of the invention will now be described, by way of example only, with reference to the accompanying drawings, in which.

DETAILED DESCRIPTION

The terms "grain", "straw" and "tailings" are used principally throughout this specification for convenience, but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
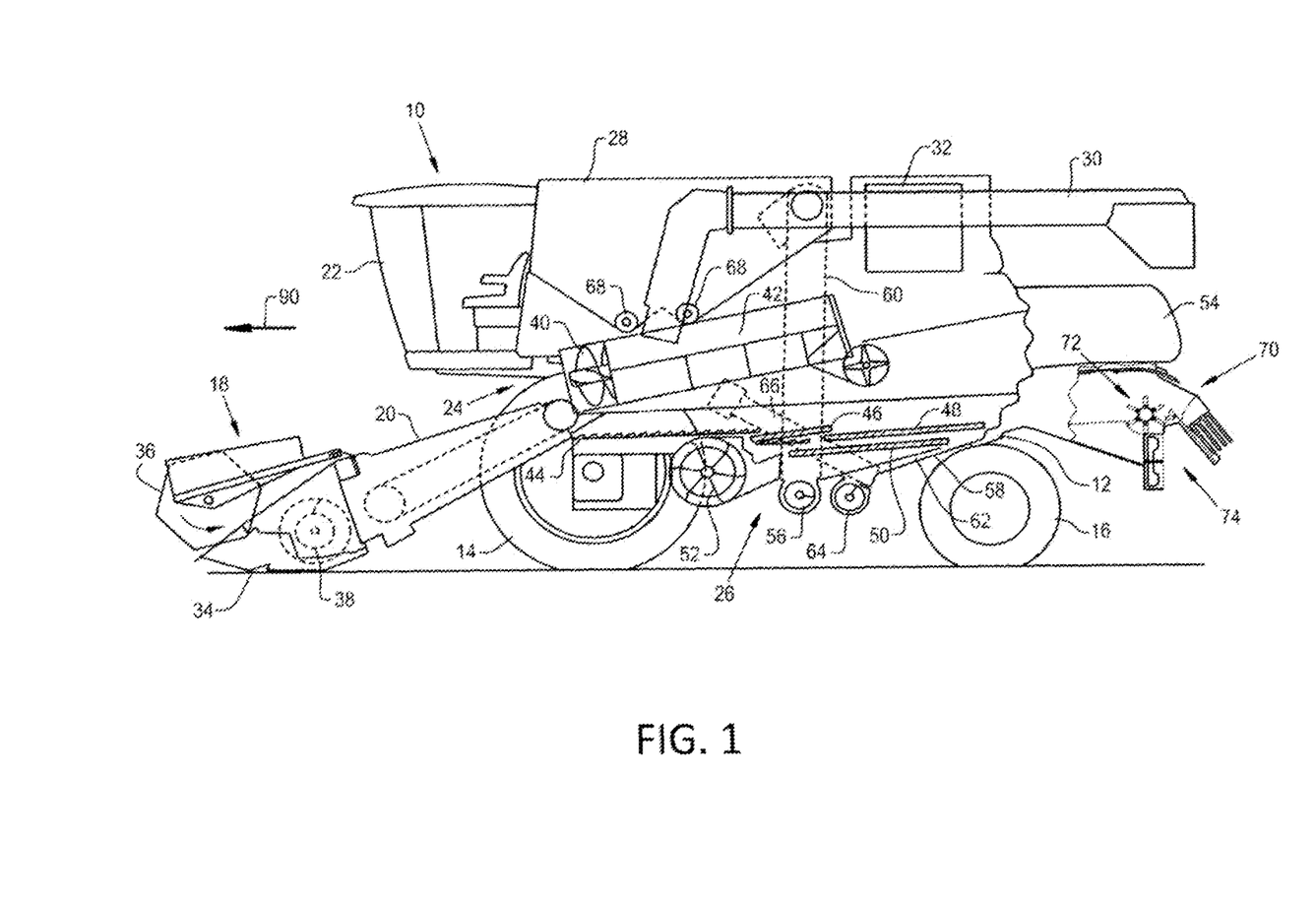
FIG. 1 is a side view of an agricultural harvester according to an aspect of the invention, the agricultural harvester including a chopper arrangement and a spreader arrangement.

Referring now to the drawings, and more particularly to FIG. 1, there is shown a schematic view of an agricultural harvester in the form of a combine harvester 10 (or simply, 'combine'), which generally includes a chassis 12, ground engaging wheels 14, 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front wheels 14 may be larger flotation type wheels, and the rear wheels 16 may be smaller steerable wheels. Motive force may be selectively applied to the front wheels 14 through a power plant in the form of a diesel engine 32 and a transmission (not shown). Although the combine 10 is shown as including wheels, it is also to be understood that the combine 10 may include tracks, such as full tracks or half-tracks.

The header 18 is mounted to the front of the combine 10 and includes a cutter bar 34 for severing crops from a field during forward motion of combine 10. A rotatable reel 36 may feed the crop into the header 18, and a double auger 38 may feed the severed crop laterally inwardly from each side toward the feeder housing 20. The feeder housing 20 conveys the cut crop to threshing and the separating system 24, and is selectively vertically movable using appropriate actuators, such as hydraulic cylinders (not shown).

In the described example, the threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed towards the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48, 50 may be subjected to a cleaning action by a fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

FIG. 1 also shows a residue handling system 70 integrated in the rear of harvester 10. More specifically, a straw hood 54 mounted residue chopper arrangement 72 is located above a straw and chaff spreader arrangement 74. In the described example, the residue spreader 74 receives two streams of crop residue when in a chopping mode: one stream from the straw chopper 72; and, another stream from the cleaning system 26. The residue spreader 74 discharges the non-grain crop material or residue across the harvested width behind the harvester 10. A mode selection door (not shown) may be located above the residue chopper 72 with a transverse axis and pivots between two positions, namely, a windrow mode and a chopping mode, such that the first stream of crop is either diverted to the residue chopper 72 (chopping mode) or over the residue chopper 72 to form a windrow (windrow mode). The residue spreader 74 may pivot about a transverse axis between an operating position and a storage or service position. A windrow chute known in the art may be provided that may or may not be attached to the spreader 74, which rotates with the spreader 74.

The chopper arrangement 72 may be mounted to the straw hood 54, and the discharge from the chopper 72 is mostly to the spreader arrangement 74. A discharge beater may propel crop towards the chopper arrangement 72. In particular, material from such a discharge beater may pass to the windrow selection door that may divert the crop residue to either: the chopper 72 for chopping; or, over the chopper 72 to form a windrow. When the door is closed, the material passes to the chopper 72 and the length of travel of the residue flow is substantially reduced by the impact or shear cutting principles of the chopper blades with the aid of counter knives if desired. The residue material then passes generally downward to the spreader 74, which has two counter-rotating impellers and a crop divider between the impellers. The divider may be placed substantially close to the swept diameter of the chopper 72 to ensure the crop residue is divided and diverted to each impeller respectively. The spreader 74 may have adjustable components that are selectively adjusted to alter the velocity imparted to the residue material to thereby control the distribution of the chopped residue on to the field. If the windrow selection door is open (windrow mode), then the discharged straw or crop residue bypasses the chopper 72 and is discharged out of the machine onto a hood or chute that guides the residue material to form a windrow behind the harvester 10. The spreader 74 may receive a second stream of crop residue in the form of chaff from the cleaning shoe in a chaff flow and incorporates this chaff residue in the spreader 74 with the chopped straw, so that all of the material, if the door is closed, is spread behind the harvester 10 in a uniform distribution. If the windrow door is open, then the spreader 74 will spread only the chaff from the chaff flow.

Figure 2:
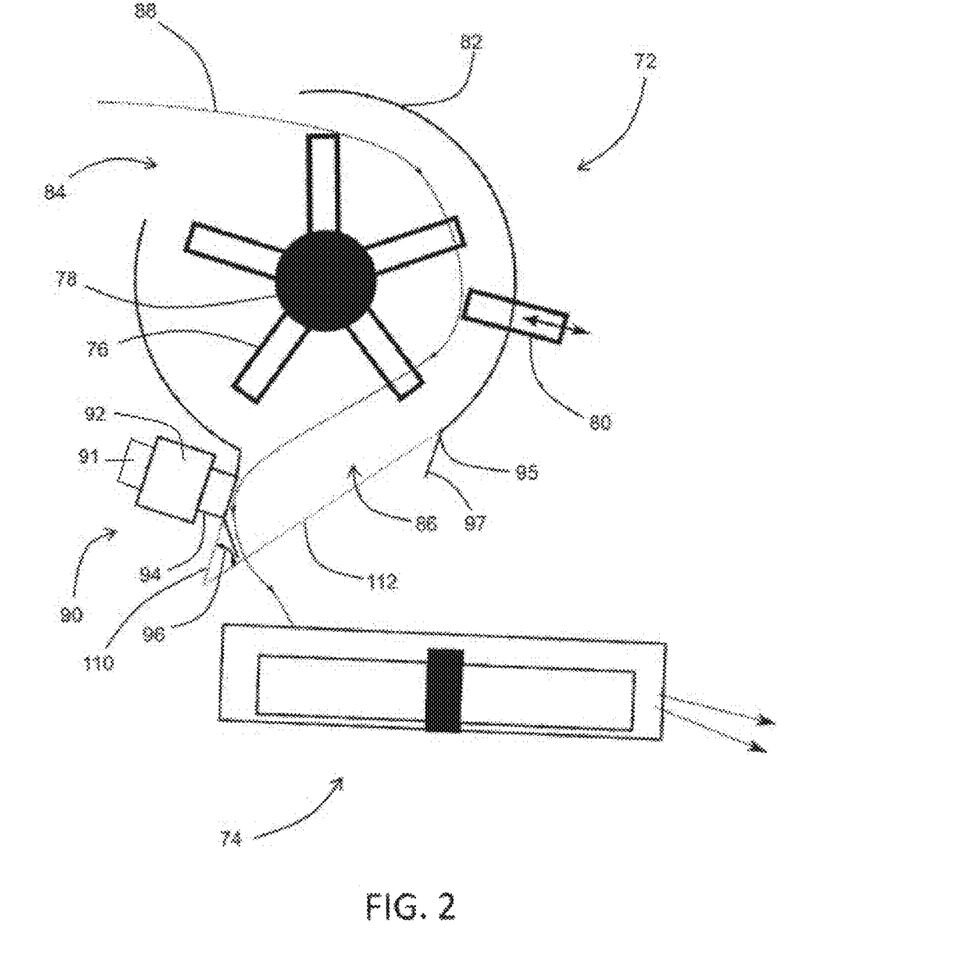
FIG. 2 is a sectional side view of the chopper arrangement and spreader arrangement of FIG. 1, and a crop material sensor arrangement of the agricultural harvester of FIG. 1 positioned adjacent to a housing of the chopper arrangement in accordance with an embodiment of the invention.

FIG. 2 shows a schematic side view of the chopper arrangement 72 and the spreader arrangement 74. The chopper arrangement 72 has a plurality of chopper blades or knives 76 that rotate about a central chopper axis 78, and which cooperate with a bank of counter knives 80 to perform chopping on crop material passing through the chopper 72.

The counter knives 80 may be movable axially relative to the chopper axis 78 to adjust a level of engagement between the rotating knives 76 and counter knives 80 which in turn adjusts a level of chopping performed on the crop material. The chopper arrangement 72 can be operated at multiple operating (rotational) speeds using mechanical drives. The chopper arrangement 72 also may include a chopper housing 82 generally around the chopper knives 76, and which defines an entrance 84 for crop material entering the chopper 72 and an exit 86 for crop material exiting the chopper 72. Indeed, a flow path 88 of the crop material indicates how the crop material enters the chopper 72, is chopped by the knives 76 and counter knives 80, and exits the chopper 72 before flowing towards the spreader arrangement 74.

FIG. 2 also shows a crop material sensor arrangement 90 of the combine harvester 10. The sensor arrangement 90 includes a crop material sensor 92—which is in the form of a camera in the described example—and a sensor window 94 through which the crop material sensor 92 monitors the crop material as it flows along the flow path 88, i.e. the camera 92 is generally behind the window 94 relative to the flow path 88. In the described example, the camera 92—which may be referred to as a 'chop cam'—collects images of the chopped crop material downstream of the chopper 72. The camera—for instance, a near infrared camera (NIR)—may be located in any suitable location downstream of the chopper arrangement 72 so that images of the stream of chopped material exiting the chopper arrangement 72 may be obtained, for instance before the crop residue reaches the spreader 74. The sensor arrangement 90 may include a flashlight that operates in conjunction with the camera 92 to obtain images of the chopped crop residue. The sensor window 94 may formed from a high-quality glass, sapphire, or other transparent that has some degree of resistance to wear/scratching. The sensor window 94 may be any suitable length, for instance several centimetres, e.g. approximately 10 centimetres.

The collected (image) sensor data may then be analysed to determine one or more factors associated with the crop material. For instance, the crop material may be analysed to determine a quality or intensity of the chopping performed by the chopper 72. The intensity or quality of the chopped crop residue may be a measure of any suitable characteristics of the chopped material, for example a length, density, thickness, etc. of the chopped straw or chaff. The determined intensity or quality of the chopped crop residue may also include information such as a relative amount of unthreshed grain in the residue, a relative amount of free grain in the residue, a colour of the straw stems (e.g. how green the stems are), straw quality, etc.

FIG. 2 illustrates that the sensor arrangement 90 is arranged adjacent to the flow path 88 defined by the crop material as it flows through the harvester 10. In the described example, the sensor arrangement 90 is downstream of the chopper 72, but upstream of the spreader 74. The sensor arrangement 90 is particularly arranged such that the sensor window 94 is adjacent to the flow path 88 such that crop material flows past the sensor window 94 as it flows along the flow path 88. Crop material may come into contact with the sensor window 94 as it flows past along the flow path 88. In the described example, the sensor arrangement 90 is arranged at, or adjacent to, the exit 86 of the chopper 72 defined by the chopper housing 82. The sensor arrangement 90 may for instance be mounted to the chopper housing 82.

A sensor arrangement that is arranged such that it is generally parallel to the flow path of crop material—in particular, such that the sensor window adjacent to the flow path is generally parallel to the flow path—may be disadvantageous in that various substances may stick or otherwise adhere to the sensor window. For instance, some crop material may become stuck against the window as it flows along the flow path adjacent to the window. Also, other dust or dirt may adhere to the window. A build-up of such substances on the window may result in the window becoming less transparent. In turn, this means that the images collected by the camera behind the window may be less useful in analysing crop material flowing along the flow path, e.g. the chop quality of the crop material. In order to ensure that the camera can collect useful image data of the crop material, an operator of a combine may need to regularly check the sensor window for accumulated substances and, if necessary, clean the window. This can be a relatively difficult task to perform, as well as being time consuming.

The present invention is advantageous in that a crop material sensor arrangement is provided in which crop material flowing along a flow path past a window adjacent to the flow path acts to clean or remove substances such as other crop material or dirt from the sensor window, or simply acts to guard against such substances accumulating on the sensor window. In this way, the sensor window retains a greater level of transparency for a greater amount of time. This means that the frequency with which the sensor window needs to be checked and/or cleaned by an operator is reduced, or the need to do this may even be eliminated. In turn, a crop material sensor of the sensor arrangement that collects sensor data associated with crop material flowing along the flow path is able to collect more accurate and useful data in order for analysis of the crop material to be performed.

The beneficial effects of the invention may be achieved by arranging the sensor window 94 to be tilted towards an upstream direction of the flow path 88. This results in an automatic cleaning effect on the sensor window 94 as crop material flows along the flow path 88 adjacent to the sensor window. As indicated schematically in FIG. 2, the crop material impacts the sensor window 94 at an angle as it flows along the flow path 88. The surface of the sensor window 94 facing the crop material may be planar; however, this surface may equally be curved, for instance. The skilled person will understand that a general incoming direction of impact of crop material flowing along the flow path 88 onto the sensor window 94 may define this impact angle.

The impact angle may be an acute angle between the sensor window 94 and the flow path 88. Although arranging the sensor window 94 to be tilted towards the incoming crop stream 88 can help to maintain the transparency of the window 94, tilting the sensor window 94 too much in this direction can lead to increased wear of the window 94, or to an increased risk of damage to the window 94. This is because the greater the impact angle (tilt angle), the more direct the impact of crop material onto the surface of the sensor window 94. This means that there is an increased risk of relatively hard objects in the crop material, e.g. stones, impacting the sensor window 94 in a manner more likely to cause damage. Also, the images of crop material collected by the camera 92 may be of lower quality when the window 94 is inclined further towards the incoming crop stream, meaning it is more difficult to accurately analyse the quality of the crop material, for instance. It is noted that the angle at which the crop material impacts the sensor window 94 will depend not only on the orientation of the sensor window 94, but also on other factors such as the type of crop being harvested, the moisture of the crop, the rotational speed of the chopper 86, etc.

The positioning of the sensor arrangement 90—and, in particular, the sensor window 94—may be made with reference to another component of the combine 10, in order that the desired cleaning effect is achieved when the crop material flows past the sensor window 94 in use. Specifically, the sensor window 94 may be positioned or oriented relative to a component of the combine 10 that defines the crop flow path 88 and that is immediately upstream (along the flow path 88) of the sensor window 94, i.e. a component that defines (at least to some extent) the angle at which the crop material impacts the sensor window 94 as it flows along the flow path 88. In the example illustrated in FIG. 2, the crop material enters the chopper housing 82 via the entrance 84, is swept internally round the chopper housing 82 towards the exit 86, and is then projected out of the chopper housing 82 via the exit 86 towards the sensor window 94. The chopper housing 82—and, in particular, an end portion 95 of the chopper housing 82 that represents the furthest downstream part of the chopper housing 82 that defines the flow path 88—is the component that is immediately upstream of the sensor window 94 in this example. The end portion 95 partially defines the chopper housing exit 86 and corresponds to the last part of the chopper housing 82 that the crop material may flow along/past before being projected via the exit 86 towards the sensor window 94. Note that in the described example, the chopper housing 82 includes a lip portion 97 that extends from the end portion 95 defining the housing 82. However, it may be seen that the crop material does not contact the lip portion 97 as it flows along the flow path 88, i.e. the lip portion 97 does not influence the flow direction of the crop material. The positioning of the sensor window 94—so that the beneficial cleaning effect is achieved—may therefore be made with reference to the end portion 95 of the housing 82 (and not the lip portion 97).

With reference to FIG. 2, an angle 96 may be defined between the end portion 95 of the chopper housing 82 and the sensor window 94. In particular, the sensor window 94 defines a (tangential) plane indicated by the dotted line 110. Also, a tangential projection—indicated by the dotted line 112—that extends from the end portion 95 of the chopper housing 82 may be defined. The end portion 95 of the chopper housing 82 corresponds in this example to the component of the combine 10 that influences the flow path 88 immediately upstream of the sensor window 94. The plane 110 and the tangential projection 112 meet or intersect to form an (acute) angle 96. There may be a preferable range for the angle 96 in order that a desired balance between the crop material having a cleaning effect on the window 94 as it flows past and maintaining the risk of hard objects causing damage to the sensor window 94 to be relatively low is achieved. By way of example, in the described example the angle 96 may be less than or equal to 44 degrees. Further optionally, the angle 96 may be greater than 29 degrees. It will be understood that these are purely illustrative bounds, and that many factors, e.g. type of crop being processed, harvesting conditions, chopper speed, etc., may influence the preferred range in order to achieve the desired effects. In the described example, an angle 96 that is closer to zero—i.e. where the plane 110 and the tangential projection 112 are closer to being parallel may increase the risk that crop material does not contact the sensor window 94 as it flows along the flow path 88, which in turn risks a lower quality of image of the crop material being able to be obtained by the sensor 92. Note that the angle 96 may be substantially similar to the impact angle of the crop material on the sensor window 94, or at least generally be within known/desired bounds of difference.

The sensor arrangement 90 may be fixed in one position or may be adjustable, either automatically or manually. In particular, the sensor arrangement 90 may be adjustable to change the angle 96 formed between the plane 110 of the sensor window 94 and the tangential projection 112 of the end portion 95 of the chopper housing 82 (or, alternatively, between the sensor window 94 and the flow path 88). This may be needed to maintain the desired balance between window cleaning and minimising the risk of window damage. Indeed, the sensor arrangement 90 may need to be adjusted simply to maintain the angle between the sensor window 94 and the flow path 88 as the flow path 88 may vary according to different factors, e.g. chopper rotational speed, harvesting conditions, etc. Alternatively, or in addition, the sensor arrangement 90 may be adjustable to change a level of insertion of the sensor window 94 into the flow path 88 of crop material. It may be that changing this level of insertion can improve the quality of sensor data relating to the crop material that is collected by the camera 92.

The combine 10 may include a controller (not shown) that can send control signals to control an actuator 91 for adjusting the position—i.e. orientation and/or level of insertion—of the sensor arrangement 90 (and, in particular, the sensor window 94) relative to other components of the combine 10, e.g. the chopper 72 or the spreader 74. In a case in which the sensor arrangement 90 is adjusted automatically, the controller may receive data indicative of one or more operating conditions of the combine 10, and control the actuator to adjust the sensor window position in dependence on the operating conditions. For instance, a rotational speed of operation of the chopper 72 may influence the direction of the flow path 88, and so as the chopper speed varies the inclination (or the position, in general) of the camera arrangement 90 may need to be adjusted to maintain the angle between the sensor window 94 and flow path 88 at a desired value, or within a desired range of values. The controller may therefore receive an indication of chopper speed as an operating condition, and transmit a control signal to control the actuator to adjust the sensor window position in dependence on the chopper speed. The sensor window position/orientation may be adjusted with reference to the angle 96 between the plane 110 and the tangential projection 112. Indeed, the chopper speed may vary in dependence on a ground speed or engine speed of the combine 10, and so the sensor window position could be controlled by the controller in dependence on the combine ground speed or engine speed. In an example in which the combine includes an integrated chopper, the controller may control the positioning of the sensor window based on the rotational speed of the chopper. On the other hand, in an example in which the combine includes a hood-mounted chopper, the controller may control the positioning of the sensor window based on the rotational speed of a beater of the combine.

Another operating condition that may affect the particular flow path followed by the crop material is the type of crop material being processed by the combine 10, e.g. corn, barley, etc. One type of crop material may be lighter than another, for instance, which results in a different flow path 88 being followed by the crop material. In such a case, the controller may receive an indication of the type of crop being harvested, e.g. by operator input, and then the controller automatically causes adjustment of the sensor window 94 in an appropriate manner such that a desired angle of impact of the crop material is achieved, e.g. by setting the angle 96 to a desired value by adjusting the sensor window 94 appropriately. Note that the desired angle may be different for different crop types. A further operating condition may include one or more harvesting conditions such as a level of moisture in the harvested crop, presence of dust, etc., that can influence the particular flow path 88 followed by the crop material. The controller may determine the particular adjustments that are to be made to the camera arrangement 90 based on data collected from experience, e.g. as part of a look-up table stored in a memory of the controller, for instance.

Separately from the automatic adjustment of the camera arrangement 90 based on operating conditions, the controller may be configured to control the sensor arrangement to move to a different position on a temporary basis before returning to a previous or default position. In particular, this temporary repositioning may be part of a cleaning loop or cleaning cycle of the sensor arrangement. Specifically, when it is determined that cleaning of the sensor window 94 is needed, the controller may be configured to control the position of the sensor arrangement 90—e.g. by increasing the inclination of the sensor window 94, i.e. increasing the angle 96—to increase the cleaning effect of the crop material as it flows past the window 94. This may be achieved by moving the window 94 so that the crop material generally impacts the window 94 in a more direct manner, which assist in dislodging or otherwise clearing accumulated substances such as other crop material, dirt, etc., on the window 94. By adjusting the window position in this manner, there may be an increased risk of damage to the window 94 and/or a risk that lower quality images are collected by the camera 92, and so once the cleaning cycle is complete the controller may adjust the sensor window 94 back to its previous position, default position, or other non-cleaning cycle position, so that the increased risk of damage, or the lower-quality image collection, is only temporary while cleaning is performed. The controller may determine to initiate the cleaning cycle in any appropriate manner. For instance, the controller may receive an input indicative of an operator request to perform the cleaning cycle.

Alternatively, the controller may be configured to perform the cleaning cycle at regular intervals, e.g. after a prescribed amount of time, after a prescribed distance of travel of the combine 10, etc. Further alternatively, the controller may be configured to receive sensor data indicative of a level of transparency of the sensor window 94, where the sensor data may be from the camera 92. In such a case, the controller may make a determination as to whether cleaning of the window 94 is required based on the current window transparency levels according to the received sensor data. For instance, a current degree of transparency of the window 94 may be determined based on an evaluation of how much of a degree of view of the camera 92 changes, e.g. analysing how many pixels of the collected image are static over time (potentially indicating a blockage at the window 94). If it is determined that cleaning is needed, then the controller may send an actuator control signal to control the actuator to temporarily adjust the sensor window position to a position that increases cleaning of the sensor window 94 for the duration of the cleaning cycle. Alternatively, or in addition, feedback as to the evaluated transparency may be sent to the combine operator, who can choose whether to initiate the cleaning cycle based on the received information. Further feedback may be provided to the operator after completion of the cleaning cycle indicative of a level of wear of the sensor window 94, which again may be determined by the controller based on collected images by the camera 92.

Figure 3:
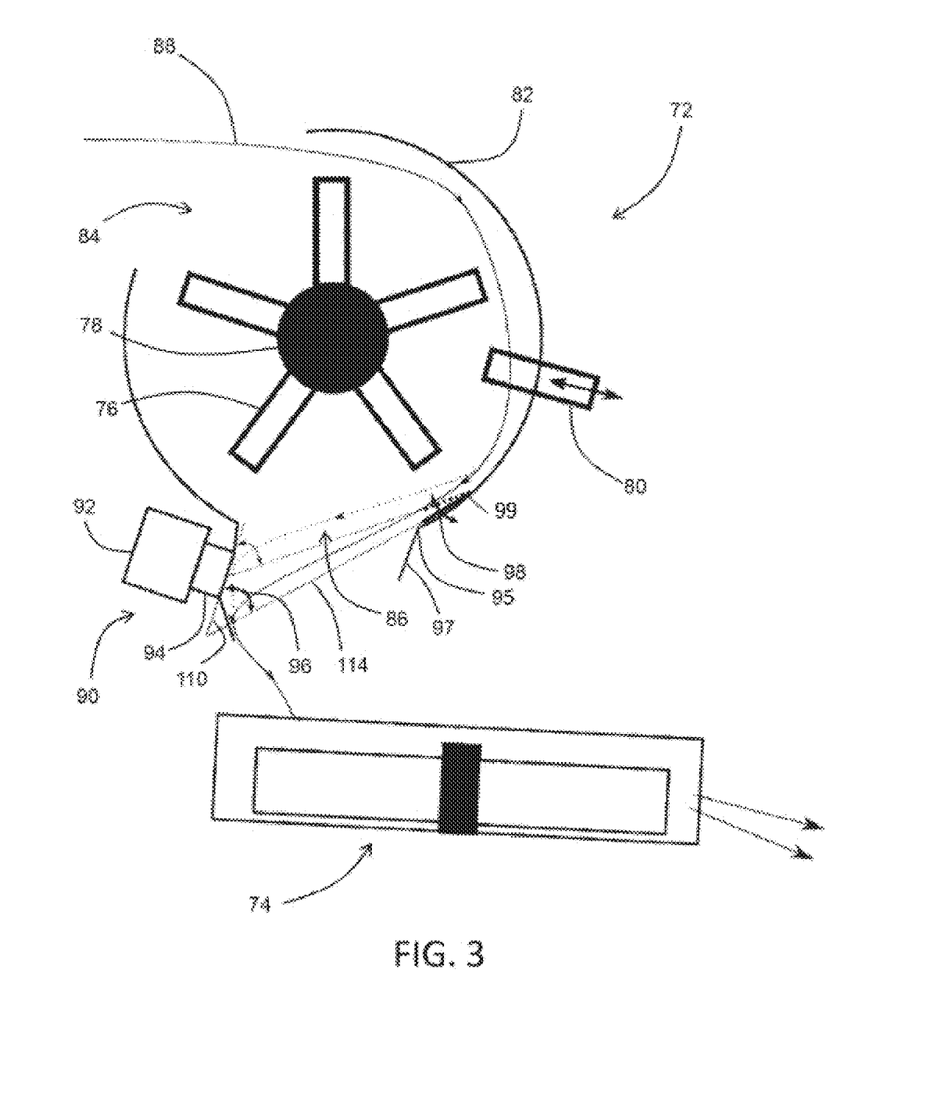
FIG. 3 is a sectional side view of the chopper arrangement, spreader arrangement, and crop material sensor arrangement of FIG. 2, and including a deflector mounted on the housing in accordance with an embodiment of the invention.

FIG. 3 illustrates a different example of the invention. In particular, FIG. 3 shows the same arrangement as in FIG. 2, except that the arrangement of FIG. 3 includes the provision of a crop deflector component 98. In the illustrated example, the deflector 98 is arranged or mounted to an inner part of the chopper housing 82. As crop material travels along the flow path 88 the crop material is redirected by the deflector 98 relative to the path the crop stream would take in the absence of the deflector 98. The deflector 98 may therefore be provided to alter the flow path 88 to direct crop material, e.g. as it exits the chopper housing 82, towards the camera arrangement 90 such that the crop stream approaches the sensor window 94 at a desired angle (or within a desired range of angles). Indeed, FIG. 3 indicates that the provision of the deflector 98 changes the impact angle of the crop stream 88. This may be a relatively simple way to ensure that the crop stream and camera arrangement 90 interact in the desired manner when there may be constraints on the chopper housing shape, camera arrangement positioning, etc., that may otherwise restrict how to achieve a desired direction of travel of the crop stream 88.

In this example illustrated in FIG. 3, the component of the combine 10 that influences or defines the crop flow path 88 and that is immediately upstream (along the flow path 88) of the sensor window 94 is the deflector 98 (and not the end portion 95 of the chopper housing, as in the example illustrated in FIG. 2). Therefore, in this described example the angle 96 is defined between the plane 110 of the sensor window 94 and a tangential projection 114 from the deflector 98. The desired range of values that the angle 96 may take may be the same as in the example illustrated in FIG. 2, i.e. greater than about 29 degrees and/or less that about 44 degrees.

The deflector 98 may be fixed relative to the chopper housing 82 or, as indicated in FIG. 3, the deflector 98 may be adjustable, e.g. pivotable about a point relative to the housing 82. In such a case, adjustment of the deflector 98 may be performed manually or automatically by actuator 99. The flow path 88 of crop material—and so the angle at which it contacts the sensor arrangement 90—may therefore be altered by adjusting the positioning of the deflector 98. This adjustment may be performed in conjunction with, or separately from, adjustment of the sensor arrangement 90 positioning as described above, in order to achieve a desired angle of impact of the crop stream 88 with the sensor window 94. The adjustment of the deflector 98 and sensor window 94 may be made with reference to the angle 96 between the plane 110 and the tangential projection 114. In the example illustrated in FIG. 3, the deflector 98 is arranged downstream of the counter knives 80 of the chopper 72. In different examples, a deflector may be arranged over or across the counter knives in a manner that influences the flow path 88. In such an example, the deflector may include slots or holes through which the counter knives extend.

Figure 4:
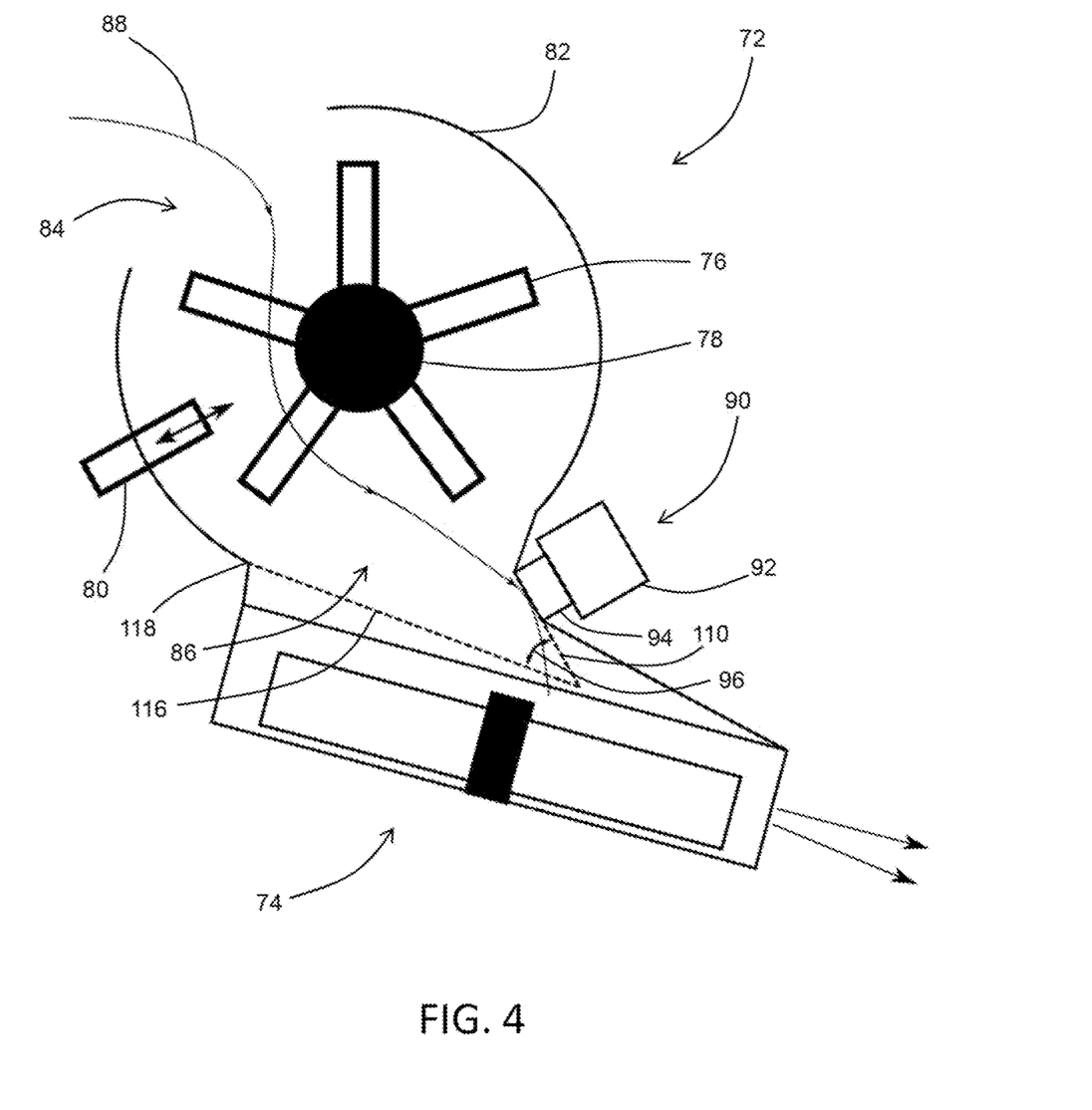
FIG. 4 is a sectional side view of the chopper arrangement and spreader arrangement of FIG. 1, and the crop material sensor arrangement of FIG. 2 positioned adjacent to the chopper arrangement housing in accordance with another embodiment of the invention.

FIG. 4 illustrates a further different example of the invention. In particular, FIG. 4 shows the same components as in FIG. 2, except that the camera arrangement 90 of FIG. 4 is arranged at an opposite side of the chopper housing exit 86 compared to FIG. 2. While in FIG. 2, the blades 76 of the chopper 72 rotate in a clockwise direction as viewed in FIG. 2, in FIG. 4 the blades 76 rotate in an anti-clockwise direction as viewed in the figure. As such, crop material is projected in a different direction in the FIG. 4 example compared to the FIG. 2 example, and so it may be beneficial to position the camera arrangement 90 differently depending on the flow path 88 defined or created by the rotating blades 76. In this example, the angle 96 is defined between the plane 110 of the sensor window 94 and a tangential projection 116 of an end portion 118 of the chopper housing 82 (in a corresponding manner to FIG. 2), which is the component that influences the flow path 88 immediately upstream of the sensor window 94.

Figure 5A:
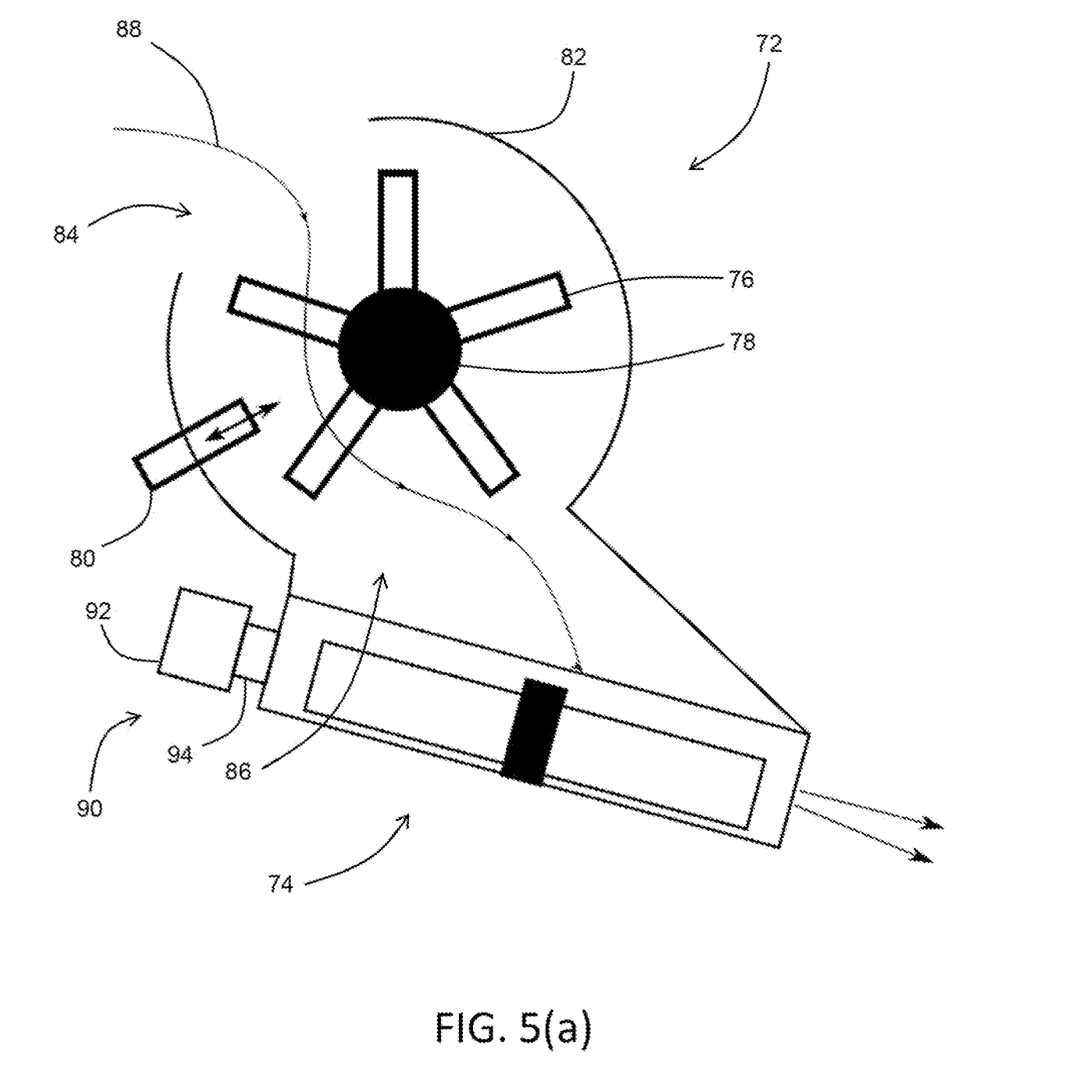
FIG. 5(a) shows a sectional side view of the chopper arrangement and spreader arrangement of FIG. 1, and the crop material sensor arrangement of FIG. 2 positioned adjacent to the spreader arrangement in accordance with another embodiment of the invention.
Figure 5B:
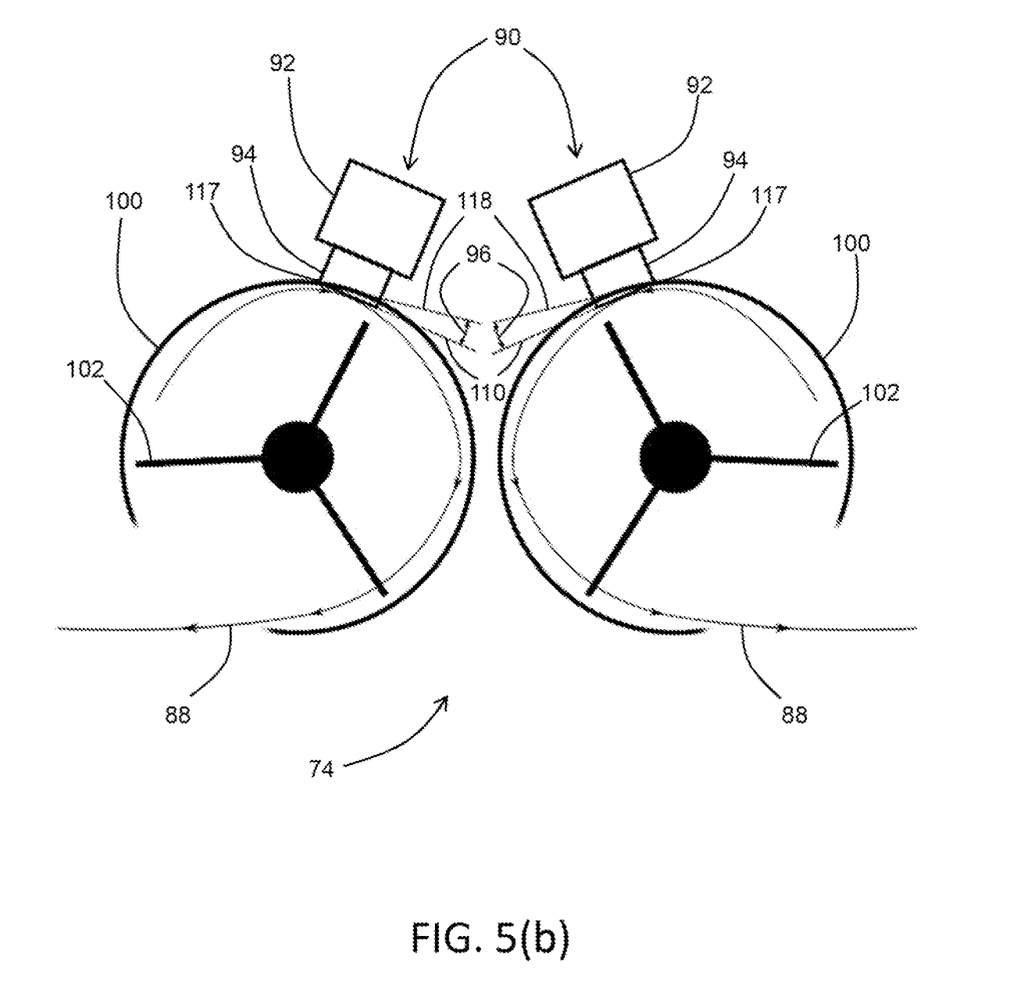
FIG. 5(b) shows a top view of the spreader arrangement and crop material sensor arrangement of FIG. 5(a); and, FIG. 6 shows a chopper arrangement, spreader arrangement and crop material sensor arrangement of the agricultural harvester of FIG. 1 in accordance with another embodiment of the invention.

FIGS. 5(a) and 5(b) illustrate a further different example of the invention. Whereas in FIGS. 3 and 4, the camera arrangement 90 is positioned at or adjacent to the exit 86 of the chopper 82, in the example illustrated in FIGS. 5(a) and 5(b), the camera arrangement 90 is instead arranged adjacent to the spreader arrangement. As shown in the top view of the spreader 74 in FIG. 5(b), the spreader arrangement 74 may include two drums 100 into which crop material from the chopper 72 is dispensed, and then propellers 102 in each of the drums spreads the crop material in different (e.g. opposite) directions. As illustrated in FIG. 5(b), each of the drums 100 may have a sensor 92 and sensor window 94 positioned adjacent thereto. As the propellers 102 rotate and move the crop material along the flow path 88, crop material is swept towards and past the respective camera windows 94. The camera arrangement 90 is positioned such that crop material travelling along the flow path 96 approaches the sensor windows 94 at a desired angle (or within a desired angle range). Crop material travelling along the flow path 88 subsequently exits the spreader arrangement 74 and out the rear of the combine 10. There may be some instances in which arranging the cameras adjacent to the spreader 74 are beneficial, e.g. because of space constraints in the combine 10. In the described example, the component or part of the combine 10 that is immediately upstream along the flow path 88 of the sensor window 94 is the inner part of the spreader drums 100 adjacent to the sensor window 94, specifically adjacent to an upstream side or edge 117 of the sensor window 94. In particular, in the described example the upstream edge 117 of the sensor window 94 is flush with the inner part of the spreader drums 100 adjacent thereto. The angle 96 is therefore defined between the plane 110 of the sensor window 94 and a tangential projection 118 of the inner part of the drums 100 adjacent to the upstream edge 117 of the sensor window 94. A desired range of values for the angle 96 in the described example may be different from that of the previously-described examples. Purely by way of illustrative example, the angle 96 in the described example may be greater than 5 degrees and/or less than 15 degrees; however, it will be understood that other values may be desired.

Figure 6:
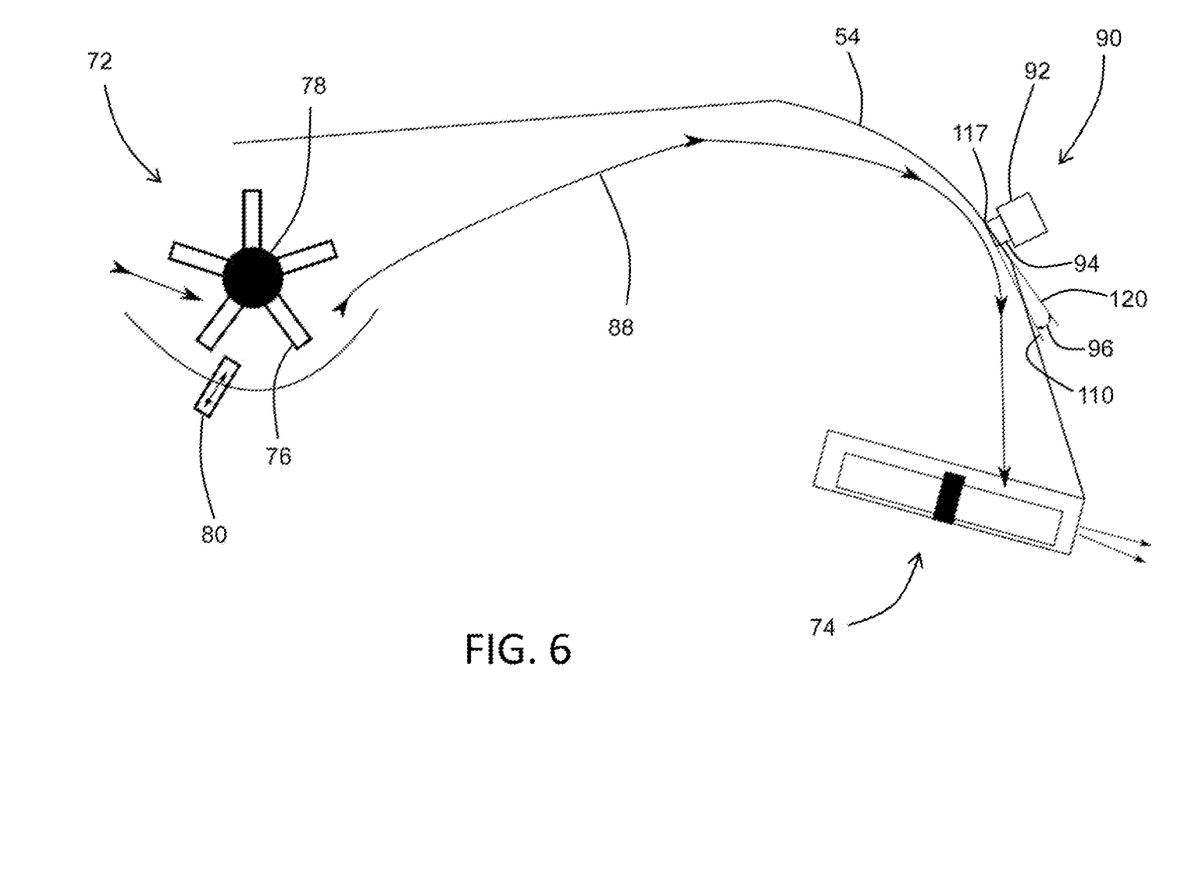

FIG. 6 illustrates a further example of the invention in which the chopper 72 is an integrated chopper arrangement instead of a rear- or hood-mounted chopper as in the previously-described examples. In this case, instead of being located substantially below the integrated chopper 72, the spreader arrangement 74 is located rearward of the chopper 72 in the combine 10. As such, instead of crop material flowing substantially downwards on exiting the chopper to the spreader, in the present example crop material is projected rearward in the combine 10 as it exits the chopper 72 and, in particular, is projected towards the spreader 74. The crop stream 88 may be directed by the hood 54 towards the spreader 74. In this example, the camera arrangement 90 is arranged adjacent to, e.g. mounted to, the straw hood 54 such that as crop material impacts the hood 54 and is redirected to the spreader 74, the camera 92 can acquire images of the crop. In particular, the camera arrangement 90 may be positioned such that the flow path 88 impacts the sensor window 94 at a desired angle. In the described example, the component or part of the combine 10 that is immediately upstream along the flow path 88 of the sensor window 94 is the part of the straw hood 54 adjacent to the upstream edge 117 of the sensor window 94. In particular, in the described example the upstream edge 117 of the sensor window 94 is flush with part of the straw hood 54 adjacent thereto The angle 96 is therefore defined between the plane 110 of the sensor window 94 and a tangential projection 120 of the part of the straw hood 54 adjacent to the upstream edge 117 of the sensor window 94. A desired range of values for the angle 96 in the described example may for instance be the same as that for the example illustrated in FIGS. 5(*a*) and 5(*b*).

In examples of the invention in which the component of the combine 10 that influences the flow path 88 immediately upstream of the sensor window 94 is spaced apart from the sensor window 94—e.g. the examples illustrated in FIGS. 2, 3 and 4—the angle between the sensor window plane 110 and the tangential projection 114 may be greater than example in which the upstream component is flush with the sensor window 94—e.g. the examples illustrated in FIGS. 5 and 6. As mentioned above, the angle 96 may preferably be in a range of approximately 29 to 44 degrees in the former case, whereas the angle 96 may preferably be in a range of approximately 5 to 15 degrees in the latter case. These ranges may provide an optimal or desired balance between a window cleaning effect and minimising the risk of window damage.

Many modifications may be made to the above-described examples without departing from the scope of the invention as defined in the appended claims.

In the above-described examples, the combine may be regarded as being in a chopping mode such that crop material is directed through the chopper in order to chop the processed crop material. In different examples, the combine may operate in a non-chopping mode or windrow mode (as described above) where a selection door is opened to direct crop material around, rather than through, the chopper. A sensor arrangement of the combine—such as the camera arrangement described above—may alternatively, or additionally, monitor crop material as the combine operates in this windrow mode. In such a case, different aspects of the crop material may be monitored using the sensor arrangement, e.g. to count grains of the crop material. Information such as the amount of unthreshed grain and/or free grain, and/or a colour of the straw stems could also be identified. For corn, a length of the ears or the amount of grain on the cobs that were not threshed would be useful inputs for adjusting the setup of the combine. In this case, the sensor arrangement can be arranged at an appropriate position downstream of the threshing and separating system of the combine and adjacent to the flow path defined in the windrow mode.

In the above-described examples, a camera is used as part of the sensor arrangements to collect image data indicative of crop material moving along the flow path. Additionally, various types of light sources can be used to improve image quality recorded by the camera. Instead of one, multiple camera's can be used. Other sensors may be used as an alternative to, or in addition to, a camera in order to monitor crop material.

It should be noted that the particular desired angle—or desired range of angles—of inclination of the sensor window towards the oncoming crop stream may differ depending on the particular location of the camera arrangement in the combine, e.g. one of the positions outlined in the above-described examples.

What is claimed is:

1. A combine harvester comprising:
a threshing and separating system;
a crop material sensor arrangement comprising a crop material sensor configured to monitor crop material downstream of the threshing and separating system, and a sensor window through which the crop material sensor monitors the crop material,
wherein the sensor window is arranged in a flow path of the crop material, wherein the crop material flows onto and past the sensor window as the crop material flows along the flow path, wherein the sensor window is arranged non-parallel to the flow path, wherein an acute angle is formed between a plane defined by the sensor window and a tangential projection that extends from a component of the combine harvester that influences the flow path immediately upstream of the sensor window.

2. A combine harvester according to claim 1, wherein the sensor window is spaced apart from the component that influences the flow path immediately upstream of the sensor window, and wherein the angle is greater than a prescribed first minimum threshold.

3. A combine harvester according to claim 1, wherein the sensor window is flush with the component that influences the flow path immediately upstream of the sensor window, and wherein the angle is less than a prescribed second maximum threshold.

4. A combine harvester according to claim 1, the combine harvester comprising a chopper arrangement configured to perform chopping on crop material downstream of the threshing and separating system, wherein the crop material sensor arrangement is arranged to monitor crop material downstream of the chopper arrangement.

5. A combine harvester according to claim 4, wherein the crop material sensor is a chop quality sensor configured to monitor a quality of chopping performed by the chopper arrangement.

6. A combine harvester according to claim 4, the combine harvester comprising a spreader arrangement downstream of the chopper arrangement, wherein the crop material sensor arrangement is arranged to monitor crop material prior to it exiting the spreader arrangement.

7. A combine harvester according to claim 6, wherein the crop material sensor arrangement is arranged to monitor crop material between the chopper arrangement and the spreader arrangement as it flows along the flow path.

8. A combine harvester according to claim 7, wherein the chopper arrangement comprises a chopper housing defining a crop material exit through which crop material exits the chopper arrangement as it flows along the flow path, wherein the crop material sensor arrangement is arranged adjacent to the crop material exit of the chopper arrangement, and wherein the component that influences the flow path immediately upstream of the sensor window is an end portion of the chopper housing that defines the crop material exit.

9. A combine harvester according to claim 6, wherein the crop material sensor arrangement is arranged to monitor crop material in the spreader arrangement, and wherein the component that influences the flow path immediately upstream of the sensor window is a part of the spreader arrangement adjacent to an upstream edge of the sensor window.

10. A combine harvester according to claim 1, the combine harvester comprising a deflector configured to deflect the flow path of crop material towards the crop material sensor arrangement, and wherein the component that influences the flow path immediately upstream of the sensor window is the deflector.

11. A combine harvester according to claim 10, wherein a position of the deflector is adjustable relative to the sensor window.

12. A combine harvester according to claim 1, wherein a position of the sensor window is adjustable relative to the component that influences the flow path immediately upstream of the sensor window.

13. A combine harvester according to claim 1, wherein the sensor window is spaced apart from the component that influences the flow path immediately upstream of the sensor window, wherein the angle is greater than a prescribed first minimum threshold, and wherein the prescribed first minimum threshold is approximately 29 degrees.

14. A combine harvester according to claim 13, wherein the angle is less than a prescribed first maximum threshold.

15. A combine harvester according to claim 14, wherein the prescribed first maximum threshold is approximately 44 degrees.

16. A combine harvester comprising:
a threshing and separating system;
a crop material sensor arrangement comprising a crop material sensor configured to monitor crop material downstream of the threshing and separating system, and a sensor window through which the crop material sensor monitors the crop material, wherein the sensor window is arranged adjacent to a flow path of the crop material such that crop material flows past the sensor window as it flows along the flow path, and wherein the sensor window is arranged such that an angle is formed between a plane defined by the sensor window and a tangential projection that extends from a component of the combine harvester that influences the flow path immediately upstream of the sensor window; and a controller configured to send an actuator control signal to an actuator of the combine harvester to control the actuator to adjust the angle between the plane defined by the sensor window and the tangential projection that extends from the component of the combine harvester that influences the flow path immediately upstream of the sensor window.

17. The combine harvester according to claim 16, wherein the actuator control signal controls the actuator to adjust the position of either the sensor window or a deflector that is configured to deflect the flow path of crop material towards the crop material sensor arrangement.

18. The combine harvester according to claim 17, wherein the actuator control signal controls the actuator to adjust the position of either the sensor window or the deflector in dependence on at least one of: a type of crop being processed by the combine harvester; and, one or more harvesting conditions in which the combine harvester is operating.

19. A combine harvester according to claim 16, wherein the controller is configured to control the actuator to adjust the angle in dependence on a chopper speed or a beater speed of the combine harvester.

20. A combine harvester according to claim 16, wherein the controller is configured to:
receive sensor data from the crop material sensor indicative of a current level of transparency of the sensor window;
determine, based on the received sensor data, whether to initiate a cleaning cycle to increase the level of transparency of the sensor window; and,
send the actuator control signal to control the actuator to temporarily increase the angle to increase cleaning of the sensor window for the duration of the cleaning cycle.

* * * * *